(12) United States Patent
Kato

(10) Patent No.: US 6,387,438 B1
(45) Date of Patent: May 14, 2002

(54) PROCESSED CRANBERRY PRODUCT AND PROCESS FOR PREPARING THE SAME

(75) Inventor: Reijiro Kato, Kanagawa Pref. (JP)

(73) Assignee: Kato Bihoen-Honpo Co., Ltd., Kanagawa (JP)

( * ) Notice: Subject to any disclaimer, the term of this patent is extended or adjusted under 35 U.S.C. 154(b) by 0 days.

(21) Appl. No.: 09/636,554

(22) Filed: Aug. 11, 2000

(30) Foreign Application Priority Data

Jul. 13, 2000 (JP) .......................................... 2000-212688

(51) Int. Cl.[7] .............................. A23B 7/08; A23L 1/09; A23L 1/212

(52) U.S. Cl. ........................ 426/639; 426/506; 426/508; 426/615; 426/658

(58) Field of Search ................................. 426/615, 639, 426/658, 506, 508

(56) References Cited

U.S. PATENT DOCUMENTS

| | | | | | |
|---|---|---|---|---|---|
| 4,543,033 A | * | 9/1985 | Agarwala | .................... | 426/639 |
| 4,814,190 A | * | 3/1989 | Ismail | ........................ | 426/639 |
| 5,364,643 A | * | 11/1994 | Morimoto et al. | .......... | 426/639 |

* cited by examiner

*Primary Examiner*—Helen Pratt
(74) *Attorney, Agent, or Firm*—Nixon & Vanderhye P.C.

(57) ABSTRACT

According to the present invention, there is provided a novel processed cranberry product which maintains the spherical form of the cranberry, and a process suitable for producing such a novel processed food. The processed cranberry product according to the present invention comprises the spherical skin of the cranberry filled with a softened and sweetened sarcocarp, and can be advantageously produced in a process in which a plurality of holes are provided through the skin of frozen cranberries by puncturing treatment, then the cranberries are immersed in a sugar solution having a sugar content of 45 to 65 degrees and heated until the sarcocarp is softened.

5 Claims, 1 Drawing Sheet

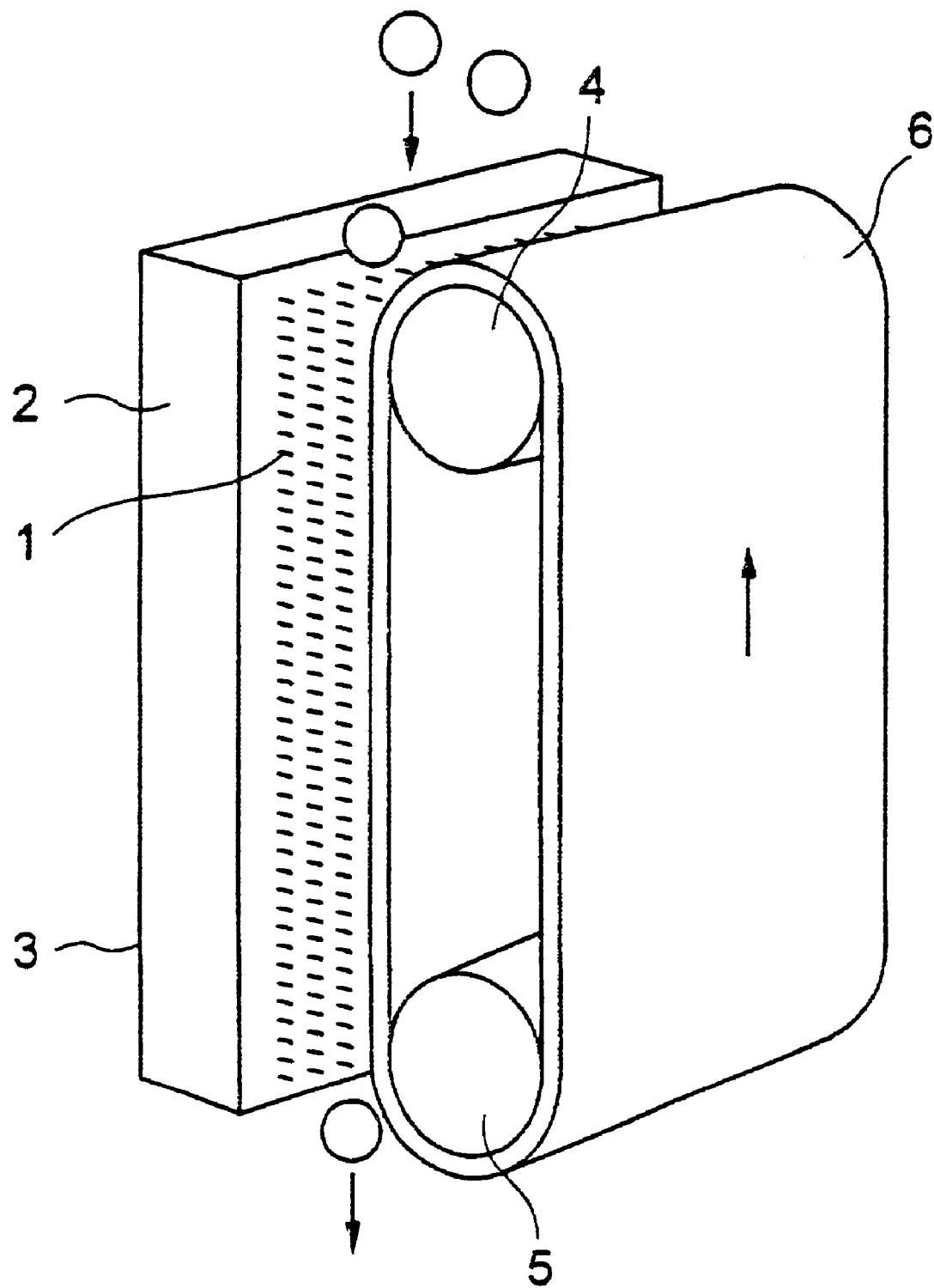

PROCESSED CRANBERRY PRODUCT AND PROCESS FOR PREPARING THE SAME

BACKGROUND OF THE INVENTION

1. Field of the Invention

The present invention relates to a processed cranberry product which is so prepared that the fruit becomes soft but the original cranberry form is maintained, and to a process for preparing such a processed cranberry product.

2. Description of the Related Art

Cranberries are the fruits of the cranberry bush, which is a plant belonging to the heath family and is grown in bogs in the Northern Hemisphere from the frigid zone to the temperate zone. They are in the form of a ball having a diameter of 15 to 20 mm, the surface of which is covered with an ekocarp, which is a waxy skin similar to that of the Chinese lantern plant. As cranberries are strongly acidic, fresh cranberries are not suitable for eating; they are squeezed to provide cranberry juice, cocked with sugar to provide a preserve, or sweetened then dried to provide dried cranberries which are eaten as dried fruit.

Since cranberries are covered with a relatively strong skin, and the ovary of the fruit is divided into three chambers by the dissepiment, when heated, air in the chamber of the ovary may expand and rupture the exocarp, or the sarcocarp may flow out to damage the appearance of the resulting product. Therefore it is difficult to obtain a product having a good appearance. Accordingly, no processed cranberry products are known in which the processed cranberries remain in the spherical form.

SUMMARY OF THE INVENTION

Accordingly, it is an object of the present invention to provide a novel processed cranberry product maintaining a spherical form from cranberries having the above-mentioned nature and properties. Another object of the present invention is to provide a cranberry processing method which is suitable for preparing such a novel processed cranberry product.

A feature of the processed cranberry product according to the present invention is that softened and sweetened sarcocarp (fruit flesh) is maintained in the spherical skin of the cranberries.

The above-mentioned processed cranberry product can be advantageously produced by a processed cranberry product preparing method comprising puncturing the skin of frozen cranberries such that a plurality of holes are provided, submerging the punctured cranberries in a sugar solution having a sugar content of 45 to 65 Brix degrees, and heating the cranberries until the sarcocarp is softened.

In the processing of the cranberries, the size of the puncture needle is preferably from 0.3 to 0.8 mm, and the sugar solution is preferably an aqueous solution of honey.

It is desirable that ripe and solid cranberries are used as the raw fruits for the process according to the present invention, since unripened cranberries have weak skins and tend to collapse during cooking. Overripe fruits may also be used in some cases.

Cranberries are washed with water if necessary to remove extraneous material, then are frozen in a freezer etc. The freezing treatment is essential for smoothly carrying out the following puncturing treatment, and freezing of the cranberries to a sufficiently low temperature is preferable.

An example of an apparatus for puncturing the frozen cranberries may comprise a processing plate in the form of, for example, a frog on which many puncture needles are planted at appropriate intervals, and a pressure belt, which may be made of, for example, rubber, the plate and the belt being positioned vertically and facing each other at such an interval that allows the cranberries to be pinched. In such an apparatus, fruits supplied from above between the processing plate and the pressure belt are rotated by the pressure belt and sent downward. Thereby the whole periphery of the skin of the fruit is nearly uniformly punctured several times. The puncturing apparatus for the fruits is not limited to this apparatus, and any apparatus having a similar function can be employed as well.

The cranberries punctured by the use of the puncturing apparatus as described above can pass very easily through the apparatus when they are frozen, however if they are thawed on the way, the fruits punctured by the needles may not roll but may collapse or clog the apparatus to stop the operation. Therefore, the fruits are frozen to a sufficiently low temperature as described above, so that they will not be thawed after being supplied to the puncturing apparatus until the puncturing process is completed.

The punctured cranberries are put into a previously prepared sugar solution having a sugar content of 45 to 65 Brix degrees, preferably at the ratio of the cranberries to the solution of almost 1:1 by weight, and gradually heated to around 65° C. When the temperature rising rate is too large, the exchange between air in the fruit and the sugar solution does not take place sufficiently, and an efficient recovery of the processed cranberry product which is spherical and soft becomes difficult. Therefore, it is desirable to take at least 10 minutes for the temperature of the cranberries to rise from the normal temperature to reach 65° C.

Additionally, the sugar solution used therefor must have a sugar content of 45 to 65 Brix degrees for producing a processed cranberry product having a spherical form and balanced acidity and sweetness. When a sugar solution having a sugar content below 40 Brix degrees is employed, too much solution enters the fruit to cause swelling of the cranberries which may result in rupturing or collapsing of the fruits. On the other hand, a sugar solution having a sugar content over 65 Brix degrees may draw out the juice from the fruits to shrivel the cranberries and the balanced taste is degraded as well.

Preferable examples of the sugar solution used in the present invention include, but are not limited to, aqueous solutions containing glucose, fructose, sucrose and the like as the main component, and any other appropriate sugar solution can be employed as well. A honey solution, for example, can provide a desirable processed cranberry product having a good flavor.

After the cranberries submerged in a sugar solution having a sugar content of 45 to 65 Brix degrees are slowly heated to 65° C., they can be cooked at a temperature of 70° C. or higher if necessary, or they can be heated until the liquid boils, if so desired. Through such a sugaring process, a tasty processed cranberry product having the spherical skin filled with a soft and sweetened sarcocarp can be produced.

As described above, according to the present invention, a novel processed cranberry product having a beautiful color and form, which is filled with a soft and tasty sweetened sarcocarp, can be placed on the market by puncturing the frozen cranberry skin, thereby preventing the swelling of the sarcocarp and the rupturing of the cranberries during the sweetening process, as well as facilitating the migration of the sugar into the sarcocarp, and further by limiting the sugar content of the sugar solution used for the process within a range from 45 to 65 degrees, thereby maintaining the spherical form of the skin, and providing a well-balanced sweet-sour taste.

BRIEF DESCRIPTION OF THE DRAWING

FIG. 1 is an external perspective view showing the structure of an apparatus for puncturing the skin of cranberries.

DESCRIPTION OF THE PREFERRED EMBODIMENTS

Cranberry Puncturing Apparatus

FIG. 1 illustrates a cranberry puncturing apparatus having a processing plate 3 comprising a base plate 2 having a width of 40 cm and a length of 26 cm, on which stainless steel puncture needles 1 having a thickness of 0.5 mm and a length of 4 mm are implanted in the form of a grid at intervals of 3 mm. The processing plate 3 is disposed in a vertical position and a pair of rollers 4 and 5 each having a diameter of 10 cm are so arranged that there is a space of 45 cm between them, and a urethane rubber pressure belt 6 having a width of 40 cm is installed vertically such that the belt runs between the two rollers and its surface is in parallel with the needle-implanted surface of the base plate while maintaining a 15 mm space therebetween. A motor is further installed to drive rollers such that the pressure belt 6 facing said processing plate 3 moves downwards at a speed of about 5 cm/sec.

Puncturing Cranberry Skin

Fully ripened fresh cranberries are washed with water and frozen at −18° C. in a freezer then supplied from a hopper (not shown) provided above the pressure belt 6 of the puncturing apparatus to supply frozen cranberries, the whole periphery of which is punctured.

The fresh cranberries washed with water and supplied to the puncturing apparatus as described above are sometimes crushed since the puncture needles 1 inserted into the skin of the fruit prevent the fruit from rolling, and the resulting product is a mixture of largely collapsed cranberries which are only usable for producing preserves.

Sweetening Process Cranberry

EXAMPLE 1

1 kg of cranberries which were punctured by the above-mentioned puncturing apparatus were put into 1 kg of a honey solution, the sugar content of which was controlled to 65 degrees by adding water in an amount of about 20%, which was then mildly heated so that the temperature reached 65° C. in about 15 minutes. They were further heated until just below boiling, then allowed to cool to give a processed cranberry product A of the present invention, the skin of which remained in a spherical form and the inside was filled with softly cooked sarcocarp.

Comparative Example 1

The same sweetening process as that used in Example 1 was repeated for cranberries which were not subjected to the puncturing treatment instead of the above-mentioned punctured cranberries. The cranberries tended to collapse before the temperature reached 65° C., and the skins were shriveled by further heating. The obtained processed cranberry product did not have a good appearance.

EXAMPLE 2 and

Comparative Examples 2 to 4

The same sweetening process as that used in Example 1 was repeated using undiluted honey (sugar content of 78 Brix degrees) as well as honey solutions having sugar contents controlled to 70, 45, and 40 Brix degrees each, instead of the honey solution having the sugar content of 65 Brix degrees as described above. The properties of the processed cranberry products B to E thus produced are listed in Table 1. These results show that sugar solutions having sugar content between 45 and 65 Brix degrees can give a tasty processed cranberry product having a good form.

TABLE 1

Effect of the sugar content of the sugar solution on the appearance of the processed cranberry products

| Processed food | A | B | C | D | E |
|---|---|---|---|---|---|
| Sugar content of sugar solution | 65 | 78 | 70 | 45 | 40 |
| Temperature | | | | | |
| 65° C. | Spherical | Shrunk | Wrinkle in a part | Spherical | Partly ruptured |
| 75° C. | Spherical | A lot of wrinkles | Wrinkles | Spherical | Largely ruptured |
| 85° C. | Spherical | Wrinkles in the major part | Shrunk | Spherical | The major part is ruptured |
| 100° C. | Spherical | Wrinkles in the most part | Largely Shrunk | Spherical | Mostly ruptured |

What is claimed is:

1. A process for preparing a processed cranberry product having a spherically shaped skin, comprising the steps of:
   (i) puncturing a spherically shaped skin of a frozen cranberry so as to provide a punctured cranberry having a plurality of holes through the skin thereof and into the sarcocarp therewithin; and thereafter
   (ii) while maintaining the spherically shaped skin of the frozen cranberry, immersing the punctured cranberry obtained according to step (i) in a sugar solution having a sugar content of 45 to 65 Brix degrees and gradually heating the sugar solution in which the punctured cranberries are immersed to 65 ° C. within at least 10 minutes until the sarcocarp is softened and sweetened so as to obtain a processed cranberry having spherically shaped skin which contains the softened and sweetened sarcocarp.

2. A process for preparing a processed cranberry product according to claim 1, wherein step (i) includes puncturing the skin of the frozen cranberry with a needle having a size from 0.3 to 0.8 mm.

3. A process for preparing a processed cranberry product according to claim 2, wherein the sugar solution is an aqueous honey solution.

4. A process for preparing a processed cranberry product according to claim 1, wherein the sugar solution is an aqueous honey solution.

5. A processed cranberry product made by the process of any one of claims 2–3.

* * * * *